US010061299B2

(12) United States Patent
Herrman et al.

(10) Patent No.: US 10,061,299 B2
(45) Date of Patent: Aug. 28, 2018

(54) METHOD FOR IMPLEMENTING DESIGN-FOR-MANUFACTURABILITY CHECKS

(71) Applicant: Plethora Corporation, San Francisco, CA (US)

(72) Inventors: Jeremy Herrman, San Francisco, CA (US); Nicholas J. Pinkston, San Francisco, CA (US)

(73) Assignee: Plethora Corporation, San Francisco, CA (US)

( * ) Notice: Subject to any disclaimer, the term of this patent is extended or adjusted under 35 U.S.C. 154(b) by 229 days.

(21) Appl. No.: 15/153,100

(22) Filed: May 12, 2016

(65) Prior Publication Data

US 2016/0259323 A1 Sep. 8, 2016

Related U.S. Application Data

(63) Continuation of application No. 14/517,734, filed on Oct. 17, 2014, now Pat. No. 9,367,063.

(Continued)

(51) Int. Cl.
*G05B 19/4097* (2006.01)
*G06Q 30/06* (2012.01)
*G06Q 30/02* (2012.01)

(52) U.S. Cl.
CPC ..... *G05B 19/4097* (2013.01); *G06Q 30/0283* (2013.01); *G06Q 30/0635* (2013.01);
(Continued)

(58) Field of Classification Search
CPC ...... G05B 19/4097; G05B 2219/35134; G06Q 30/0283; G06Q 30/0635; G06F 17/50
See application file for complete search history.

(56) References Cited

U.S. PATENT DOCUMENTS 4,901,253 A 2/1990 Iwano et al.
4,974,165 A 11/1990 Locke et al.
(Continued)

OTHER PUBLICATIONS

"Manufacturing; Study Data from S. Mouton et al Provide new Insights into Manufacturing" (Defense & Aerospace Business, Jul. 6, 2011, p. 218) (hereinafter "Manufacturing").
(Continued)

*Primary Examiner* — Charles Kasenge
(74) *Attorney, Agent, or Firm* — Jeffrey Schox; Diana Lin

(57) ABSTRACT

One variation of a method for implementing design-for-manufacturing checks during construction of a virtual model of a real part includes: in response to insertion of a virtual feature into the virtual model, estimating a minimum stock geometry for the real part based on the virtual feature; selecting a first material stock cross-section from a set of available material stock cross-sections of a material designated for the real part based on the minimum stock geometry; at a first time, prompting a user to adjust a dimension of the virtual feature to enable production of the real part with a second material stock cross-section in the set of material stock cross-sections, less than the first material stock cross-section; at a second time succeeding the first time, submitting, to a manufacturing facility and over a computer network, an order for production of a unit of the real part according to the virtual model.

20 Claims, 4 Drawing Sheets

Related U.S. Application Data

(60) Provisional application No. 61/892,370, filed on Oct. 17, 2013.

(52) U.S. Cl.
CPC ............ *G05B 2219/35134* (2013.01); *G06F 2217/12* (2013.01); *Y02P 90/265* (2015.11)

(56) References Cited

U.S. PATENT DOCUMENTS

| | | | |
|---|---|---|---|
| 5,243,665 A | 9/1993 | Maney et al. | |
| 5,552,995 A | 9/1996 | Sebastian | |
| 5,717,598 A * | 2/1998 | Miyakawa | G05B 19/4097 700/103 |
| 5,726,917 A | 3/1998 | Staaden | |
| 5,796,619 A | 8/1998 | Wampler | |
| 5,822,206 A | 10/1998 | Sebastian et al. | |
| 5,910,894 A | 6/1999 | Pryor | |
| 6,223,092 B1 * | 4/2001 | Miyakawa | G05B 19/4097 700/100 |
| 6,295,513 B1 | 9/2001 | Thackston | |
| 6,625,616 B1 | 9/2003 | Dragon et al. | |
| 6,675,055 B1 | 1/2004 | Fischer | |
| 6,701,200 B1 | 3/2004 | Lukis et al. | |
| 6,836,699 B2 | 12/2004 | Lukis et al. | |
| 6,928,396 B2 | 8/2005 | Thackston | |
| 7,027,889 B2 | 4/2006 | Nakamura | |
| 7,089,082 B1 | 8/2006 | Lukis et al. | |
| 7,103,434 B2 * | 9/2006 | Chernyak | G06F 17/50 700/103 |
| 7,123,986 B2 | 10/2006 | Lukis et al. | |
| 7,146,291 B2 | 12/2006 | Hough | |
| 7,216,011 B2 | 5/2007 | Brisebois | |
| 7,280,948 B2 | 10/2007 | Duggirala | |
| 7,299,101 B2 | 11/2007 | Lukis et al. | |
| 7,496,528 B2 | 2/2009 | Lukis et al. | |
| 7,590,466 B2 | 9/2009 | Lukis et al. | |
| 7,603,191 B2 | 10/2009 | Gross | |
| 7,639,267 B1 | 12/2009 | Desimone et al. | |
| 7,840,443 B2 | 11/2010 | Lukis et al. | |
| 8,014,889 B2 | 9/2011 | Zinniel et al. | |
| 8,140,401 B2 | 3/2012 | Lukis et al. | |
| 8,239,284 B2 | 8/2012 | Lukis et al. | |
| 8,295,971 B2 | 10/2012 | Krantz | |
| 8,538,574 B2 | 9/2013 | Hahn | |
| 8,581,855 B2 | 11/2013 | Spink et al. | |
| 8,695,958 B2 | 4/2014 | Marrinan | |
| 8,745,517 B2 | 6/2014 | Hartloff | |
| 8,799,830 B2 * | 8/2014 | Robles | G06F 17/5022 716/111 |
| 2003/0125901 A1 | 7/2003 | Steffey et al. | |
| 2003/0126038 A1 | 7/2003 | Lukis et al. | |
| 2004/0250236 A1 | 12/2004 | Amadon et al. | |
| 2005/0080502 A1 * | 4/2005 | Chernyak | G06F 17/50 700/97 |
| 2005/0096780 A1 | 5/2005 | Lukis et al. | |
| 2005/0120010 A1 | 6/2005 | Philpott et al. | |
| 2005/0125092 A1 | 6/2005 | Lukis et al. | |
| 2005/0251771 A1 * | 11/2005 | Robles | G06F 17/5022 716/52 |
| 2005/0281453 A1 | 12/2005 | Boyer | |
| 2006/0200270 A1 | 9/2006 | Lukis et al. | |
| 2006/0212160 A1 | 9/2006 | Brisebois | |
| 2006/0253214 A1 * | 11/2006 | Gross | G06F 17/50 700/97 |
| 2007/0038531 A1 | 2/2007 | Lukis et al. | |
| 2007/0042327 A1 | 2/2007 | Swift | |
| 2007/0173963 A1 | 7/2007 | Bjornson et al. | |
| 2007/0206030 A1 | 9/2007 | Lukis | |
| 2007/0208452 A1 | 9/2007 | Lukis et al. | |
| 2008/0015947 A1 | 1/2008 | Swift | |
| 2008/0269942 A1 | 10/2008 | Free | |
| 2009/0125418 A1 | 5/2009 | Lukis et al. | |
| 2009/0198505 A1 | 8/2009 | Gipps et al. | |
| 2009/0259440 A1 | 10/2009 | Reed et al. | |
| 2010/0023150 A1 | 1/2010 | Cai et al. | |
| 2010/0185312 A1 | 7/2010 | Wang et al. | |
| 2010/0225666 A1 | 9/2010 | Beauchemin | |
| 2010/0332196 A1 | 12/2010 | Fisker et al. | |
| 2011/0047140 A1 | 2/2011 | Free | |
| 2011/0054655 A1 | 3/2011 | Krantz | |
| 2011/0060439 A1 | 3/2011 | Lukis et al. | |
| 2011/0093106 A1 | 4/2011 | Sinha et al. | |
| 2011/0307225 A1 | 12/2011 | Sims et al. | |
| 2012/0078591 A1 | 3/2012 | Sims | |
| 2012/0078592 A1 | 3/2012 | Sims | |
| 2012/0140041 A1 | 6/2012 | Burgunder et al. | |
| 2012/0249820 A1 | 10/2012 | Beauchemin | |
| 2012/0271443 A1 | 10/2012 | Sinha et al. | |
| 2012/0316667 A1 | 12/2012 | Hartloff | |
| 2013/0018525 A1 | 1/2013 | Jang et al. | |
| 2014/0163720 A1 | 6/2014 | Nelaturi et al. | |
| 2015/0012171 A1 | 1/2015 | Richter et al. | |

OTHER PUBLICATIONS

Hui-Fen Wang, You-Liang Zhang, CAD/CAM integrated system in collaborative environment, Robotics and Computer-Integrated Manufacturing, vol. 18, Issue 2, Apr. 2002, pp. 135-145.

Tek-Jin Nam, David Wright, The development and evaluation of Syco3D: a real-time collaborative 3D CAD system, Design Studies, vol. 22, Issue 6, Nov. 2001, pp. 557-582.

* cited by examiner

METHOD FOR IMPLEMENTING DESIGN-FOR-MANUFACTURABILITY CHECKS

CROSS-REFERENCE TO RELATED APPLICATIONS

This application is a continuation of U.S. patent application Ser. No. 14/517,734, filed 17 Oct. 2014, which claims the benefit of U.S. Provisional Application No. 61/892,370, filed on 17 Oct. 2013, both of which are incorporated in their entirety by this reference.

TECHNICAL FIELD

This invention relates generally to the field of manufacturing, and more specifically to a new and useful method for quoting part production in the field of manufacturing.

DESCRIPTION OF THE EMBODIMENTS

The following description of the embodiments of the invention is not intended to limit the invention to these embodiments, but rather to enable any person skilled in the art to make and use this invention.

1. Method

Figure 1:
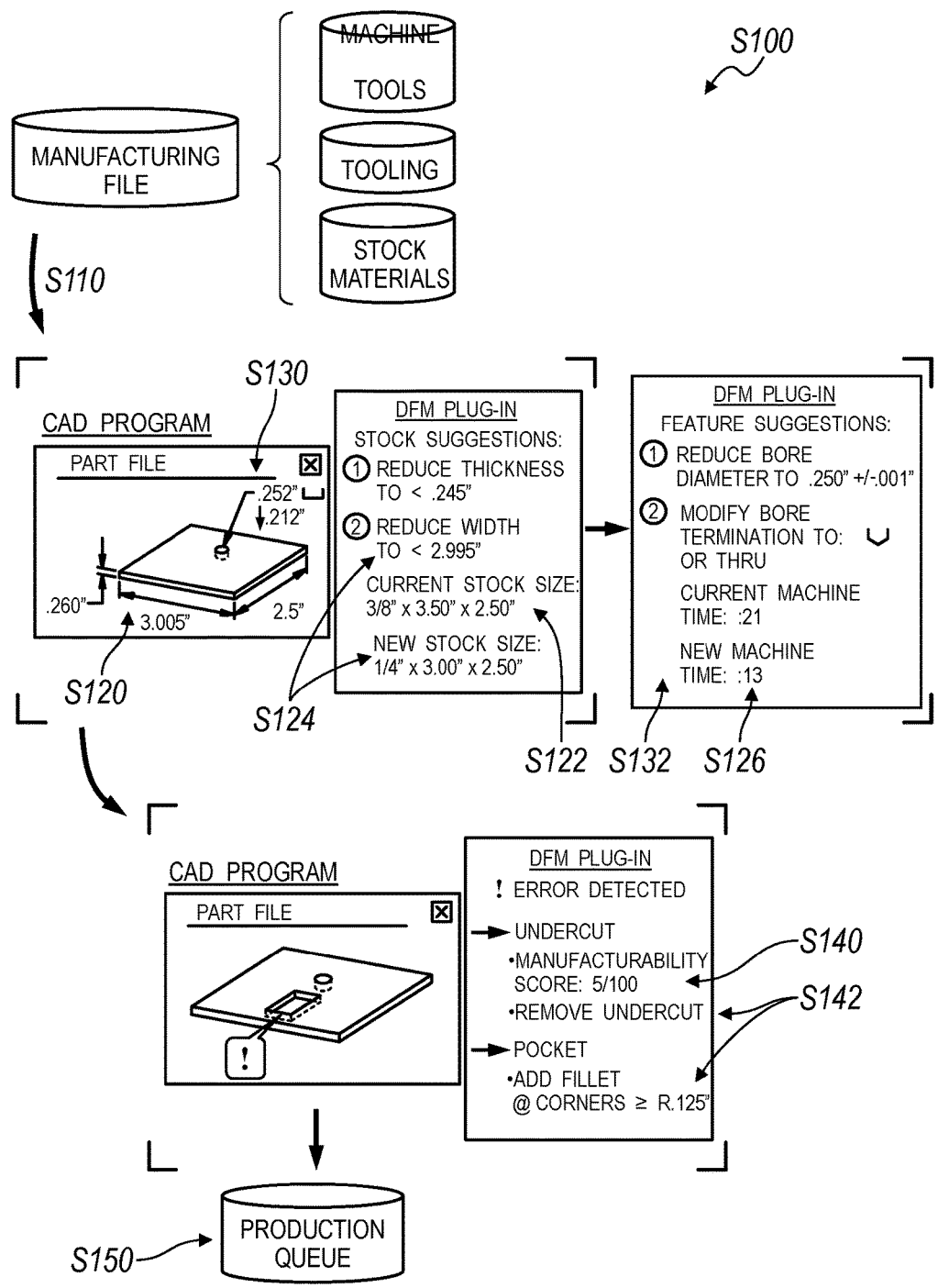
FIG. 1 is a flowchart representation of a method.

As shown in FIG. 1, a method S100 for implementing design-for-manufacturability checks during construction of a virtual model of a real part within a computer-aided drafting engine executing on a computing device includes: in response to insertion of a virtual feature into the virtual model, estimating a minimum stock geometry for the real part based on the virtual feature in Block S120; selecting a first material stock cross-section from a set of available material stock cross-sections of a material designated for the real part based on the minimum stock geometry in Block S122; at a first time, prompting a user, through the computer-aided drafting engine, to adjust a dimension of the virtual feature to enable production of the real part with a second material stock cross-section, in the set of available material stock cross-sections of the material, less than the first material stock cross-section in Block S124; at a second time succeeding the first time, submitting, to a manufacturing facility and over a computer network, an order for production of a unit of the real part according to the virtual model in Block S150.

As shown in FIG. 1, one variation of the method S100 includes: at the computer-aided drafting engine, receiving a manufacturing file specifying geometries of a set of cutting tools currently in operation at a manufacturing facility in Block S110; in response to insertion of a virtual feature into the virtual model, preemptively selecting a first cutting tool, from the set of cutting tools specified in the manufacturing file, of greatest dimension suitable for machining the real part according to the virtual feature in Block S130; at a first time, prompting a user, through the computer-aided drafting engine, to adjust a geometry of the virtual feature to enable machining of the real part with a second cutting tool, in the set of cutting tool, of dimension greater than a dimension of the first cutting tool in Block S132; at a second time succeeding the first time, submitting, to a manufacturing facility and over a computer network, an order for production of a unit of the real part according to the virtual model in Block S150.

As shown in FIG. 1, another variation of the method S100 includes: at the computer-aided drafting engine, receiving a manufacturing file defining a machine tool availability, a tooling availability, and a set of stock dimensions of available materials for a manufacturing facility in Block S110; in response to insertion of a dimensioned stock geometry feature into a part file within the computer-aided drafting engine and in response to selection of a material within the part file, displaying a first notification within the computer-aided drafting engine in Block S124, the first notification including a suggestion for an alternative stock dimension based on the set of stock dimensions of available materials; in response to insertion of a second dimensioned feature geometry into the part file; displaying a second notification within the computer-aided drafting engine in Block S132, the second notification including a suggestion for an alternative dimension of the first dimensioned feature geometry based on the tooling availability; in response to insertion of a third dimensioned feature geometry into the part file, generating a manufacturability score for the second dimensioned feature geometry based on the machine tool availability in Block S140; and displaying the third notification within the computer-aided drafting engine in response to the manufacturability score that falls below a threshold manufacturability score in Block S142, the third notification including a suggestion for an alternative feature geometry.

2. Applications

Figure 3:
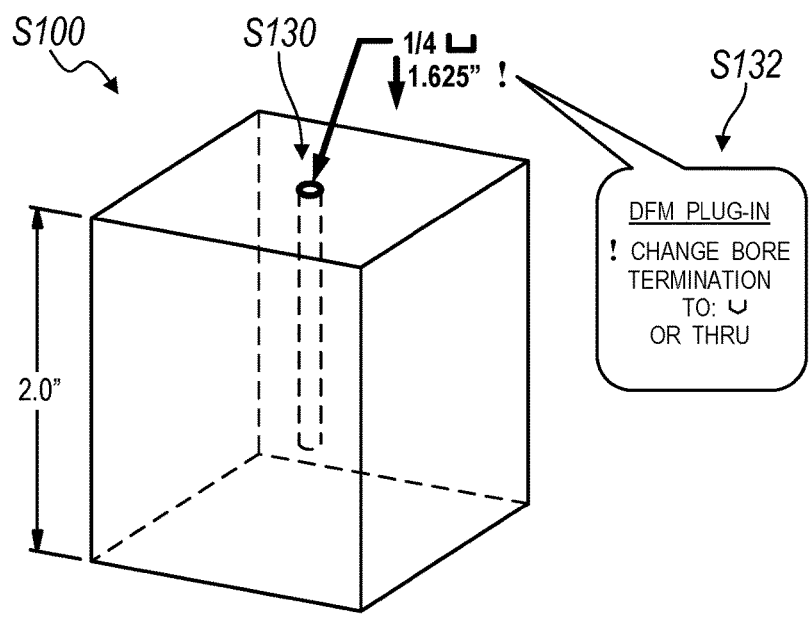
FIG. 3 is a graphical representation of one variation of the method.
Figure 4:
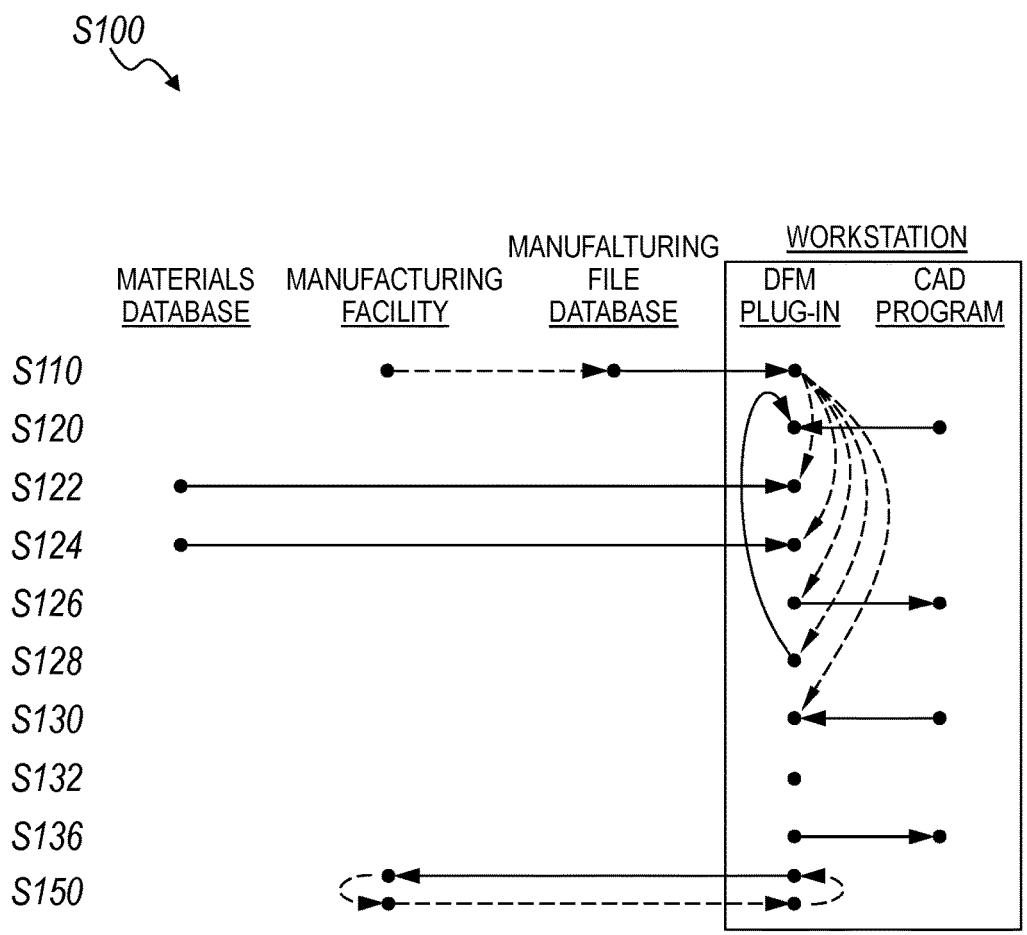
FIG. 4 is a flowchart representation of one variation of the method.

Generally, the method S100 implements design-for-manufacturability (DFM) checks in real-time as a virtual model of a real part (to be manufactured) is constructed within a computer-aided drafting (CAD) program. The method S100 can be implemented within the CAD program executing locally on a user's workstation (e.g., desktop computer, laptop computer) to analyze a virtual model in light of a manufacturing file corresponding to (current) manufacturing capabilities of a particular manufacturing facility as new virtual features are inserted into (i.e., created or 'built' within) a part file containing the virtual model, and the method S100 can handle delivery of prompts or suggestions to the user—through the CAD program—to modify various virtual features of the virtual model as manufacturability issues are identified within the new virtual features. The method S100 can similarly execute within a DFM plug-in executing within the CAD program, such as on a user's workstation, as shown in FIGS. 3 and 4.

Figure 2:
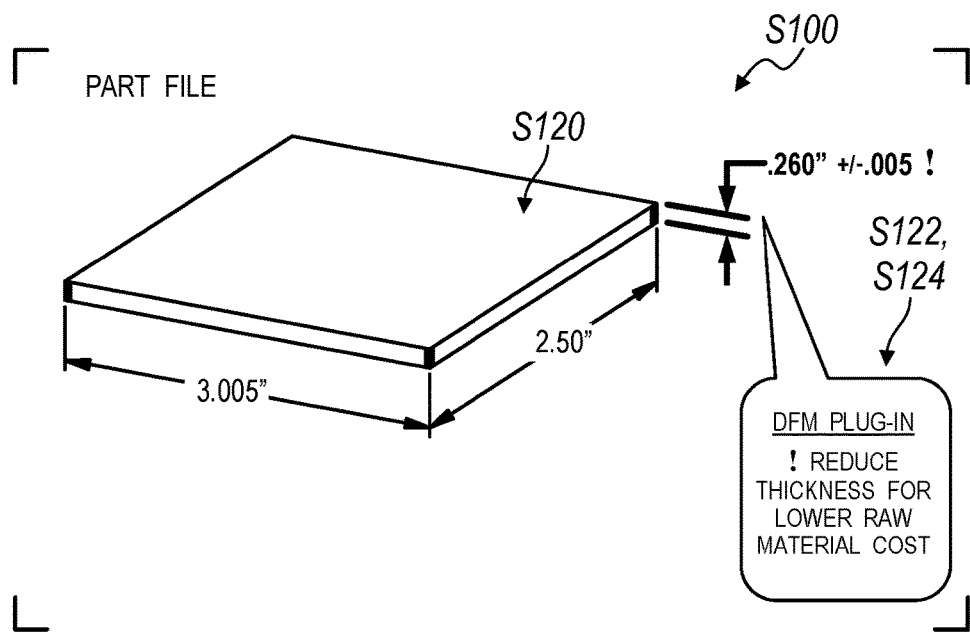
FIG. 2 is a graphical representation of one variation of the method.

In one implementation, the method S100 generates manufacturability-related notifications based on a material selection for a unit of the real part corresponding to the virtual model and based on a minimum stock geometry necessary to manufacture the unit of the real part, such as by displaying a prompt (e.g., a notification) within the CAD program to reduce a dimension (e.g., a thickness) of a particular virtual feature to enable selection of a smaller material stock cross-section for production of the unit, which may correlate with less material waste and/or with reduced per-unit cost, as shown in FIGS. 1 and 2. In another implementation, the method S100 generates manufacturability-related notifications based on virtual features defined within the virtual model and based on tooling availability (e.g., tooling sizes, tooling configurations) of the manufacturing facility, as defined in the manufacturing file, such as by displaying a notification within the CAD program or within the DFM plug-in to increase a local radius of a compound surface to enable surfacing of real part—according to the compound surface—with a larger ball endmill, which may correlate with reduced machining time and therefore reduced per-unit cost. In yet another implementation, the method S100 generates manufacturability-related notifications based on virtual features inserted into the virtual model and based on a selected manufacturing process (e.g., milling, turning, spinning, sand casting, injection modeling, etc.) for production of a unit of the corresponding real part, such as by displaying a notification within the CAD program or within the DFM plug-in to fillet a corner of a blind pocket to enable a machining of the blind pocket with an endmill (e.g., rather than blind wire-EDM), as shown in FIG. 1, which may enable production of the real part and/or correlate with reduced per-unit cost for the real part. However, the method S100 can generate any other manufacturability-related notification based on any other part or manufacturability factor, and the method S100 can display these notifications or prompts within the CAD program and/or within the DFM plug-in in any other suitable way.

Generally, the method S100 applies a manufacturing file—specifying manufacturing and/or material sourcing capabilities, etc. of a manufacturing facility—to virtual features added to the virtual model to identify manufacturability-related issues for a real part to be manufactured according to the geometry of the virtual model substantially in real-time as virtual features are added to the part file containing the virtual model. The manufacturing file can be specific to a particular manufacturing facility and can include current, confirmed, and/or projected manufacturing capabilities (e.g., on-hand and operable machining centers) of the manufacturing facility; a list of standard and/or custom tooling available at the manufacturing facility; and/or a schedule of tooling, machine tool, and/or machining center availability for the manufacturing facility (e.g., in the form of a calendar); etc. The manufacturing file can additionally or alternatively include generic data, such as local, regional, and/or international supply of material stock cross-sections and material stock lengths for common materials or for materials supported by the manufacturing facility.

The method S100 can execute within a CAD modeling program executing on a workstation, such as on a desktop computer, laptop computer, tablet, or other computing device. For example, the method S100 can execute within a design-for-manufacturability (DFM) plug-in within the CAD program, and the DFM plug-in can retrieve the manufacturing file from the manufacturing facility over an Internet connection (e.g., from an application server hosting manufacturing data collected from and/or by the manufacturing facility), locally compare virtual futures within a virtual model constructed within the CAD program part to the manufacturing file, and generate and display manufacturability-related notifications within the CAD program substantially in real-time as virtual features are constructed therein. Alternatively, the method S100 can be executed remotely from a workstation, such as within an application server hosting a native computer-aided drafting application or locally on a server hosted by the manufacturing facility. However, the method S100 can be implemented on any other computer system, such as a cloud-based, mainframe computer system, grid-computer system, or other suitable computer system or computer network.

By collecting current manufacturing facility-specific data—such as by downloading a manufacturability file directly from the manufacturing facility—and applying these data to a virtual model locally on a user's computing device, the method S100 can enable secure real-time manufacturability analysis for production of units of the real part by the specific manufacturing facility based on real and current manufacturing capabilities of the manufacturing facility. In particular, rather than uploading all or a portion of a virtual (e.g., CAD) model of the real part to a remote server for processing to generate a manufacturability-related prompts for adjusting virtual features of the virtual model, the method S100 can execute locally with the CAD program during construction of a virtual model of the real part such that none (or only a limited portion) of the virtual model need be transmitted from a user's workstation to identify manufacturing issues for the real part. Furthermore, by downloading real and current manufacturing data from a manufacturing facility and executing locally on the user's workstation, the method S100 can generate a manufacturability-related prompts for the virtual model in real-time as features are added to the virtual model rather than only once the virtual model is completed and submitted to the manufacturing facility. In particular, by testing each new virtual feature added to a part file within the CAD program—such as in the context of virtual features previously added to the part file—the method S100 can enable a user to immediately ascertain the manufacturability of each virtual feature and/or the related manufacturing cost without repeatedly re-submitting the virtual model of the real part (e.g., in various stages of completion) to a remote entity (e.g., the manufacturing facility) for manufacturability detection.

The method S100 can alternatively implement similar functionality to deliver generic (i.e., facility-agnostic) DFM prompts to the user, such as based on common or established manufacturing practices and general availability of common material stock cross-sections.

3. Manufacturing File

Block S110 of the method S100 recites, at a computer-aided drafting engine executing on a computing device, receiving a manufacturing file specifying manufacturing capabilities of a particular manufacturing facility. Generally, Block S110 can function to receive, retrieve, or otherwise collect manufacturing data corresponding to the manufacturing facility, such as machine tool availability, tooling availability, stock cross-sections of materials for machining supported by the manufacturing facility, geometries of cutting tools currently in operation at or supported by the manufacturing facility, etc. Block S110 can also collect the manufacturing file containing, machining center configuration, a current manufacturing schedule, a pricing structure, a pricing model, feature manufacturing risk, and/or manufacturing history, etc. of the manufacturing facility.

In one implementation, the manufacturing file specifies machining capabilities of the machining centers operable within the manufacturing facility. For example, a particular manufacturing facility can support a set of lathes of various sizes, a set of milling machines of various sizes, and a set of boring and tapping machines of various sizes, and the manufacturing file can specify machining volumes in X, Y, Z, A, B, etc. travels, maximum workpiece dimensions (e.g., maximum throw for a lathe), number of tools supported in a tool changer, tool change positions, look-ahead capabilities (e.g., for surfacing), maximum spindle speeds and tool feeds, maximum spindle or tool load, table area and fixture options, precision and accuracy of movements, spindle runout, and/or lead screw backlash, etc. for each machining center currently to scheduled to be operational at the manufacturing facility. The manufacturing file can also include a calendar of current, scheduled, and/or predicted configurations of machining centers over a period of time (e.g., eight weeks), such as which machining centers are or will be configured to handle certain materials, what tooling is or will be loaded into particular machining centers, and fixturing types assigned to the machining centers (e.g., vices with hard jaws, vice with soft jaws, vacuum plate, T-slot bed for custom fixtures, indexing head, etc.). For example, the manufacturing file can specify when a particular CNC milling machine is scheduled to machine plastics, aluminum alloys, steel alloys, and/or copper alloys. The manufacturing file can additionally or alternatively specify which standard tooling (e.g., a standard roughing endmill, a standard-size finishing endmill, a standard-size ball endmill, a standard centerdrill) and/or custom or less-common tooling (e.g., a custom keyseat cutter, a threadmill) will be loaded into a particular CNC milling machine. Block S124 and Block S130 can therefore deliver prompts to the user to adjust a virtual feature in the virtual model to enable production of the real part with an alternative machining center, such as with a machining center that is available sooner in the calendar to enable faster fulfillment of an order for the real part.

The manufacturing file can similarly specify general tooling availability and/or tooling currently stocked by the manufacturing facility. For example, the manufacturing file can include a list of endmill and lathe tool sizes and configurations (e.g., number of flutes, roughing or finishing specification, center-cutting specification, coating, material, associated working material, positive or negative rake, end profile, maximum tool aspect ratio, etc.), fixturing options (e.g., fixture plate stock, soft jaws, hard jaws, vacuum plates, etc.), fixture tab preferences, etc. used or employed by the manufacturing facility. The manufacturing file can additionally or alternatively contain a list of tooling sizes and configurations available from a supplier (e.g., a tooling manufacturer, retailer, or wholesaler), such as affiliated with the manufacturing facility. In this implementation, the manufacturing file can also specify a static per-unit and/or per-unit-time pricing for a particular cutting tool. Alternatively, the manufacturing file can contain a model defining a time-dependent continuous function or step function for cost to machine with the particular tool, such as based on a general or tool-specific wear model defining end-of-life or useful-life duration for the particular tool, such as dependent on part material type, spindle speed, feed rate, and/or cut type (e.g., climbing or conventional), etc. for a machining operation. Block S130 can thus preemptively: elect a machining center and a particular cutting tool—from the set of available machining centers and available cutting tools for the manufacturing facility—to machine a unit of the real part according to the first three-dimensional virtual geometry; predict a toolpath, spindle speed, and feed rate for the particular cutting tool to machine the first three-dimensional virtual geometry; and thus calculate a cost for use of the particular tool in manufacturing a unit of the real part according to the current virtual model; Block S132 can then deliver a prompt to the user to adjust the virtual feature to enable manufacture with a different cutting tool and/or a difference machining center to reduce the manufacturing cost for the unit of the real part.

The manufacturing file can also contain similar information for other machine tool types and correspond production techniques supported and/or implemented by the manufacturing facility, such as other conventional machining, forming (e.g., spinning, stamping, punching), cutting (e.g., waterjet cutting, wire EDM, laser cutting), additive manufacturing (e.g., fused deposition modeling), welding, brazing, casting (e.g., sand casting, investment casting, die casting), injection molding, and/or other manufacturing techniques. For example, the manufacturing file can specify minimum and maximum weld fillet sizes for various sheetmetal thicknesses for various materials, minimum waterjet kerf (i.e., cut width), minimum corner radius for wire EDM machining, minimum fused deposition feature size, etc.

The manufacturing file can specify material stock availability (e.g., material stock cross-section sizes) for various materials supported in production by the manufacturing facility. For example, the manufacturing file can include a list of types of working materials assigned to various machining centers within the manufacturing facility and corresponding data sheets for the various materials, such as specifying weldability, machinability castability, mechanical property data, etc. of each of the various supported materials. The manufacturing file can also contain material stock cross-section sizes, such: as width, thickness, diameters, and/or maximum length dimensions corresponding dimensional tolerances (e.g., ±0.010" by width and thickness), and corresponding geometric tolerances (e.g., +0.020" flatness over 10") for bar, rod, and plate stock; gauge, maximum width and length dimensions, and corresponding dimensional tolerances for sheet material stock; etc. The manufacturing file can further specify predicted availability of one or more stock materials, such as based on a current material supply and market price. For example, the manufacturing file can include a schedule for price per unit length of various materials in various stock cross sections, such as a price per inch of ¼" by 4" 303 stainless steel plate, a price per foot of 6061-T6 aluminum extrusion (e.g., 80/20), and a price per ounce of polyethylene injection molding pellets, etc. The manufacturing file can include cost per cut from material stock, which can be constant across all materials or material stock sizes or specific to a material or material stock size. For example, the manufacturing file can include a dynamic model of cost per cut based on a coefficient for each material and a cross-sectional area of the stock, such as $0.29-per-square-inch cross-section for stainless steel, $0.15-per-square-inch cross-section for 6061-T6 aluminum, and $0.04-per-square-inch cross-section for polyethylene. The manufacturing file can include static prices per unit length of material (i.e., prices that do not change with total amount of stock material ordered) or that are dynamic, such a based on a constant function defining an inverse relationship between price-per-unit-length of a particular stock material and total amount of the stock material for a job. Block S110 can also populate the manufacturing file with a current real material cost—such as by retrieving commodity process for various materials from a commodities database—as well as a shipping cost for delivery of material for an order for a current number of units of the real part; Blocks S120 and S130 can thus implement these data to calculate a cost for machining the real part according to a virtual feature within the virtual model; and Blocks S124 and S132 can automatically deliver prompts to the user to adjust the virtual feature to reduce material stock cost, to reduce material waste, and/or to reduce machining time and therefore machining cost for the real part.

Block S110 can therefore (passively) receive or (actively) retrieve a manufacturing file containing any one or more of the foregoing static or dynamic manufacturing- and/or pricing-related parameters or models relevant to the manufacturing facility. These pricing parameters and/or models can be defined by the manufacturing facility and then delivered to the CAD program in Block S110, such as over the Internet. In one implementation, the manufacturing file is generated automatically (or semi-manually) by the manufacturing facility. In one example, a model of production capabilities of the manufacturing facility is generated and refined over time as prototyping and production jobs are completed by the manufacturing facility and as details of the completed jobs are added to the production capabilities model. Such manufacturing data can also be added manually to the manufacturing file, such as by a representative of the manufacturing file as new tooling and/or machining centers come online or offline and as jobs are completed at the manufacturing facility. The manufacturing facility can also set and/or update these data, such as on a second, minute, hourly, daily, or weekly schedule, and Block S110 can actively or passively collect these updated data for application in subsequent Blocks of the method S100 to automatically serve manufacturability-related prompts to the user. Block S110 can thus collect current manufacturing, projected capacity, tooling, material stock, machining center availability, and other data from the manufacturing facility for application in subsequent Blocks of the method S100 to deliver current (i.e., up-to-date) manufacturability-related prompts to the user through the CAD program. Alternatively, Block S110 can actively collect these data and aggregate these data into a local manufacturing file stored locally on the user's workstation, such as by scraping a server affiliated with the manufacturing facility for manufacturing-related data.

Once the CAD program is opened and/or a new part file is created locally on a user's (e.g., a customer's) computing device, Block S110 can load the manufacturing file into the CAD program and/or into the DFM plug-in. However, Block S110 can function in any other way to access production, tooling, and/or material-sourcing capabilities of the manufacturing facility, etc. and to load these data onto a local workstation running the CAD program and/or the DFM plug-in to enable real-time manufacturability-related prompts to a user in subsequent Blocks of the method S100 as the user generates a virtual model of the real part.

4. Part File

In one variation, the method S100 initiates a part file in which a virtual model of a real part is constructed within the computer-aided drafting engine. Generally, the method S100 can create a new part file (and/or a new part file within an assembly file) within the CAD program, as shown in FIG. 1. The method S100 can thus prepare the part file to record a sequence of virtual geometries—such as revolved bosses and cuts, extruded bosses and cuts, swept bosses and cuts, weldments, etc.—entered by a user through the CAD program and to generate a virtual three-dimensional model from the sequence of features; Block S120, S122, S124, S130, S132, etc. can thus analyze the virtual model at various stages throughout the virtual build to preempt manufacturability issues and/or to identify features of the virtual model affecting relatively high manufacturing costs and/or relatively high manufacturing risk.

5. Stock

Figure 5:
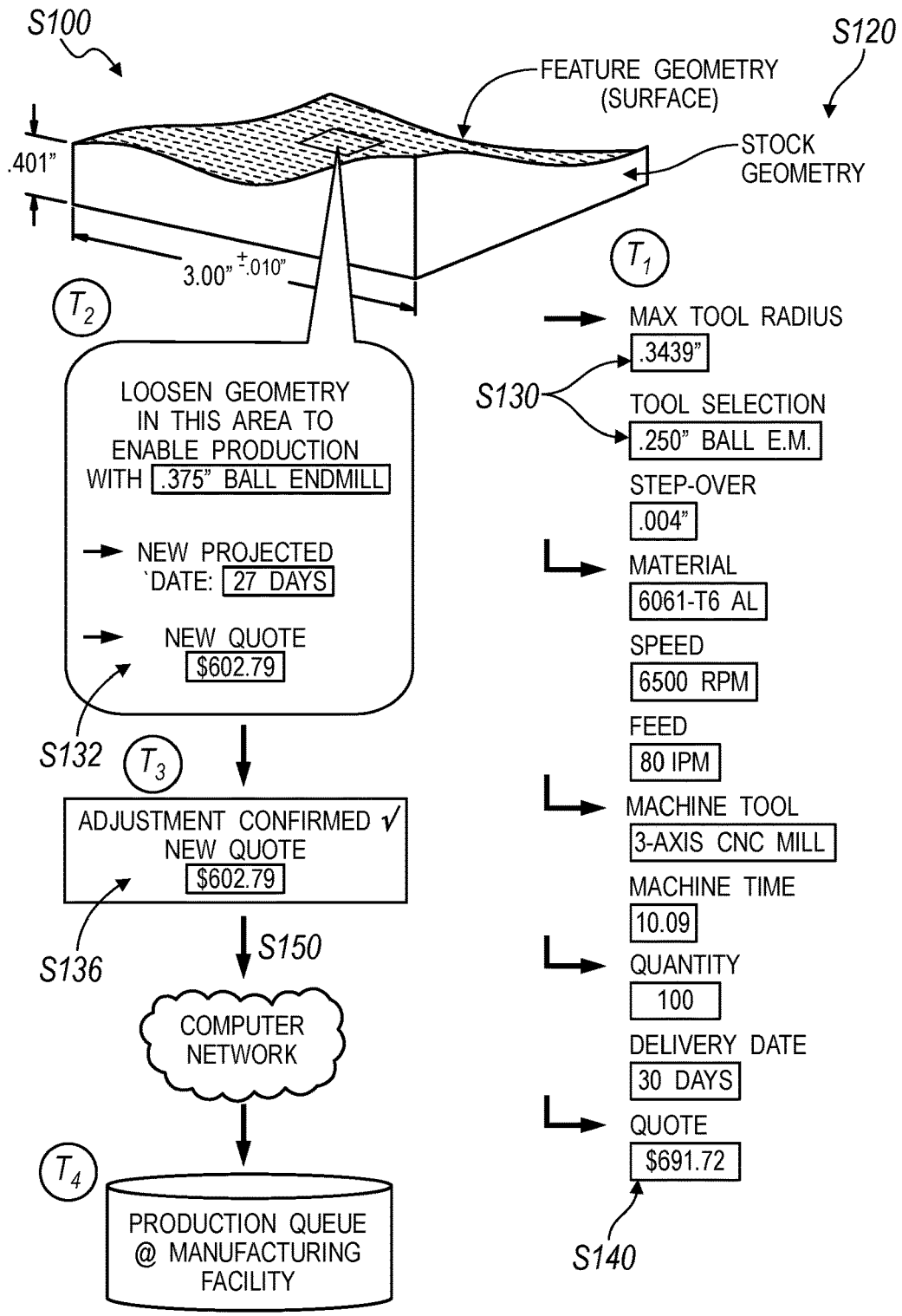
FIG. 5 is a flowchart representation of one variation of the method.

Block S120 of the method S100 recites, in response to insertion of a virtual feature into the virtual model, estimating a minimum stock geometry for the real part based on the virtual feature; Block S122 of the method S100 recites selecting a first material stock cross-section from a set of available material stock cross-sections of a material designated for the real part based on the minimum stock geometry; and Block S124 of the method S100 recites, at a first time, prompting a user, through the computer-aided drafting engine, to adjust a dimension of the virtual feature to enable production of the real part with a second material stock cross-section, in the set of available material stock cross-sections of the material, less than the first material stock cross-section. Generally, Blocks S120, S122, and S124 function to predict a minimum three-dimensional size of a volume of material (a "stock geometry") necessary to produce a unit of the real part according to one or more virtual features defined within the virtual model and to make suggestions to the user to adjust one or more virtual features in the virtual model to reduce a cost of material stock for the real part, to reduce a manufacturing time (and therefore a total manufacturing cost) for the real part, to reduce a fulfillment time for an order of units of the real part, etc., as shown in FIG. 5. For example, Block S120, S122, and S124 can cooperate to extrapolate a minimum necessary stock geometry for the real part from one or more virtual futures defined within the part file, to identify a first material stock cross-section available in a material elected for the real part based on the minimum stock geometry, to identify a second material stock cross-section available in the material and nearly suitable but (slightly) undersized for the real part, and to present a suggestion to the user to modify a dimension of the virtual feature(s) of the virtual model to enable selection of the second material stock cross-section for manufacture of the real part. In another example, Blocks S120, S122, and S124 can cooperate to identify a particular material stock of a cross-section nearest that of the stock geometry necessary to manufacture the real part and to prompt the user to adjust a virtual feature in the model to enable manufacture of the real part with the particular material stock if the cross-section of the particular material stock is undersized for the cross-section of the stock geometry predicted for the real part based on the virtual model. Block S120 can therefore estimate a minimum stock geometry for the real part based on a single virtual feature or a set of virtual geometries defined within the virtual model, and Block S124 can select a particular virtual feature—from the set of virtual geometries contained within the virtual model—for adjustment to enable production of the real part with a second material stock cross-section.

In one implementation, Block S120 predicts a machining process for manufacturing a unit of the real part and calculates a minimum stock geometry for the real part according to the predicted manufacturing process. For example, Block S120 can default to a predicting manufacture of the real part via a subtractive manufacturing process (e.g., turning, milling), and Block S120 can correlate a first virtual feature (or virtual geometry) inserted into the part file—such as a revolved boss or an extruded boss—with a stock geometry for the real part, as shown in FIG. 1. In this example, Block S120 can then extract dimensions from the stock geometry to estimate a minimum material stock size from which a unit of the real part can be machined. Block S120 can further predict a preferred orientation of the material stock for machining, one or more part flips and a corresponding part flip sequence, locations of tabs or other fixturing features in unit with the real part during manufacture, and/or sizes of the fixturing features, etc., and Block S120 can apply these parameters to the first virtual geometry to estimate the minimum stock size for a unit of the real part to achieve reliable fixturing with sufficient stock material to fully realize the virtual model in a completed unit of the real part. Based on the minimum stock size estimate, Block S122 can then select a stock material of cross-section and of minimum length (such as accounting for a cut tolerance, such as a bandsaw cut tolerance, as specified in the manufacturing file) for the stock material that fully encompasses the minimum stock size estimate for the real part, such as for a default material (e.g., 6061-T6 aluminum) or in response a selection of a particular material—from a list of materials supported by the manufacturing facility and noted in the manufacturing file—entered into the computer-aided drafting program.

In another implementation, Block S120 can extrapolate a minimum rectilinear volume (e.g., for milling) or cylindrical volume (e.g., for turning) that fully contains the virtual model—and all virtual features contained therein—based on dimensions and/or tolerances defined in the part file. Block S120 can also implement methods or techniques described in U.S. patent application Ser. No. 14/517,711 filed on 17 Oct. 2014, to predict fixturing setups though production of the real part, to add virtual fixture features to the virtual model as necessary to achieve the predicted fixturing methods, and to calculate the minimum stock geometry for the real part that accounts for both the virtual features of the virtual model and the virtual fixture features automatically predicted for the real part. For example, Block S120 can identify axial symmetry abut a common axis for all or a large subset of virtual features defined in the virtual model, predict manufacture of the real part via turning on a lathe, predict a size and an orientation of a fixturing boss extending from the real part sufficient for supporting the real part off of a chuck during a turning operation, and calculate the minimum length of a stock geometry for the real part to accommodate for both the geometry of the final part and the geometry of the fixturing boss.

In a similar example, for a virtual model defining a thin machined part, Block S120 can predict production of the real part by milling on a vertical machining center and fixturing the real part according to thin web fixturing techniques; in this example, Block S120 can cooperate with Blocks S130 and S132 to select a cutting tool (e.g., an endmill) for machining a perimeter of the real part, estimate a thin web width around the perimeter of the real part based on a size of the cutting tool, and to apply a minimum width requirement for material between the outer wall of the thin web and the outer perimeter of the material stock to estimate the minimum cross-section and the minimum length of material stock for production of a unit of the real part. In another example, Block S120 can predict production of the real part by milling on a vertical machining center and predict fixturing the real part with a set of tabs in-unit with the real part based on a high ratio of curved or compound surfaces to planar surfaces defined in the virtual model. In this example, Block S120 can automatically calculate a number of tabs of minimum cross-section and maximum length and locations of each of the number of tabs extending from the real part into the base material stock during production, and Block S120 can apply a minimum width requirement for material between an end of a tab and the outer boundary of the material stock to estimate the minimum cross-section and minimum length of material stock for production of a unit of the real part.

Block S120 can thus analyze one or more virtual features contained within the part file to estimate a minimum stock geometry (e.g., length, width, height, and/or diameter) from which to machine a unit of the real part according to the virtual model. From the minimum stock geometry, Block S122 can then select a first material stock—from a list of available material stocks—of cross-section that most nearly approximates and fully contains the minimum stock geometry of the real part determined in Block S120. Block S122 can further calculate a dimensional difference (e.g., a length, a width, a thickness, a radius) between the cross-section of the first material stock and a cross-section of the minimum geometry across a corresponding plane; if a dimension of the first material stock exceeds a dimension of the minimum stock geometry calculated for the real part by greater than a threshold value—such as by more than 0.125" or by more than half of a step size for the dimension for material stock in the selected material—Block S122 can trigger Block S124 to prompt the user to modify the corresponding virtual feature to enable manufacture of the real part with material stock one size (or more) smaller than first material stock, thereby reducing material waste, machining time, and per-unit cost, etc.

Alternatively, Block S122 can select a material stock—from a list of available material stocks—of cross-section that most nearly approximates the minimum stock geometry of the real part, as determined in Block S120. Block S122 can further calculate a dimensional difference (e.g., a length, a width, a thickness, a radius) between the cross-section of the first material stock and a cross-section of the minimum geometry across a corresponding plane. In this implementation, if the dimensional difference between the cross-section of the first material stock and the cross-section of the minimum geometry shows the first material stock to be undersized for the minimum stock geometry, such as by less than a threshold amount (e.g., by no more than 0.025"), Block S122 can identify a portion of the virtual model (e.g., a particular virtual geometry or a portion of a virtual geometry in the virtual model) that can be (minimally) modified to lessen the cross-section of the minimum geometry such that the selected material stock can fully encompass the minimum geometry. Block S124 can then deliver a prompt to the user to modify the virtual model (e.g., the particular virtual geometry or the portion of a virtual geometry in the virtual model) accordingly. However, if the difference between the cross-section of the first material stock and the cross-section of the minimum geometry shows the first material stock to be undersized for the minimum stock geometry by more than the threshold amount (e.g., by more than 0.025"), Block S122 can select an alternative (larger) material stock cross-section for manufacture of the real part.

In one example of the foregoing implementations, Block S110 can retrieve the threshold difference of 0.025" (0.64 mm) from the manufacturing file, and Block S124 can prompt the user to reduce the thickness of a virtual feature defined in the virtual model from 0.255" to 0.250" such that the part can be machined from stock 0.25"-thick plate rather than from stock 0.375"-thick plate, as shown in FIGS. 1 and 2. In this example, Block S124 can also account for dimensional tolerances on available material stocks and prompt the user to reduce the dimensioned thickness of a virtual feature in the virtual model from 0.250" to 0.245" with a tolerance of 0.005" such that the real part can be machined from nominal 0.25" plate stock with a dimensional tolerance of ±0.010" rather than from stock 0.375" plate to meet the specified dimension and tolerance. Block S124 can similarly prompt the user to adjust a tolerance on a dimension of the virtual feature based on a standard dimensional tolerance of a material stock cross-section selected for the real part. For example, Block S124 can prompt the user to loosen the tolerance on a thickness dimension of a virtual feature in the virtual model from 0.250"±0.005" to 0.250"±0.010" such that the real part can be machined from nominal 0.25" plate stock with a dimensional tolerance of ±0.010" rather than from stock 0.375" plate to meet the specified thickness dimension and tolerance for the real part. Block S124 can therefore display, within the computer-aided drafting engine, a prompt to decrease a length specified in a dimension of the virtual feature and/or to loosen a tolerance on a dimension of the virtual feature.

Block S124 can also account for a minimum finishing pass depth (e.g., 0.005" for stainless steel, 0.002" for aluminum, as specified in the manufacturing file) and a tolerance on the final part (e.g., ±0.005") in prompting the user to modify one or more virtual features within the virtual model. For example, for aluminum selected as the material for the real part, Block S124 can prompt the user to reduce the thickness of the virtual feature in the virtual model from 0.250"±0.005" to 0.243"±0.005" such that the real part can be machined from nominal 0.25"-thick plate stock with a dimensional tolerance of ±0.010" and with a 0.002" finishing pass while still achieving the thickness dimension and tolerance specified for the virtual feature in the part file. However, in a similar example, for a thickness dimension of 0.270"±0.0025" assigned to a virtual feature, Block S122 can elect a 0.375"-thick plate stock for the real part because the dimensional difference between the minimum geometry of the real part (e.g., 0.2675") and the minimum possible corresponding dimension of the material stock (e.g., 0.25"-0.010", or 0.240") exceeds the threshold difference (e.g., 0.0275" difference exceeds the 0.025" difference threshold); in this example, Block S124 can thus withhold a prompt to reduce the thickness and/or loosen the tolerance on the dimension assigned to the virtual feature.

In the foregoing implementation, Blocks S122 and S124 can also apply a dynamic (e.g., parameterized) threshold difference between a selected stock cross-section of a material and a minimum stock geometry of the real part—determined in Block S120. For example, Block S122 can calculate a threshold difference value for each dimension or virtual feature within the virtual model as a percentage (e.g., 1%) of an overall dimension of the real part. Blocks S122 and S124 can alternatively implement a parameterized threshold difference—between the minimum stock size of the real part and the material stock cross-section—that is based on available stock cross-section sizes of a material selected for the real part to trigger a prompt to modify the virtual feature, such as dynamic threshold differences corresponding to 10% of a dimensional difference between adjacent stock sizes for stock cross-sections available in the material elected for the real part. Yet alternatively, Blocks S122 and S124 can implement a threshold difference that is customized for the user, such as a threshold difference set manually by the user or a threshold difference set automatically based on a determined cost sensitivity of the user.

In another implementation, Block S120 can identify the real part—represented in the virtual model—as suitable for production by injection molding (or diecasting, sandcast, etc.), such as based on a quantity of units of the real part selected by the user for the order, based a material elected by the user for the real part (e.g., a thermoform plastic), based on identification of a living hinge within the virtual model, based on a thickness of one or more virtual features within the virtual model, based on a complexity of a virtual surface within the virtual model, and/or based on a texture callout on a virtual surface of the virtual model, etc. In this implementation, Block S120 can calculate a minimum rectilinear volume (e.g., cubic volume) that fully contains the real part, and Block S122 can select a particular standard mold size—from a set of standard mold sizes—sufficient to produce a unit of the real part by injection molding based on the minimum rectilinear volume. Block S122 can also reference the minimum mold size against platen sizes (and tonnages) of injection molding machines operational at the manufacturing facility, such as specified in the manufacturing file, to identify a particular injection molding machine or type or group of injection molding machines for production of the real part with tooling made from the particular standard mold size. (Block S120 can similarly compare the minimum mold size to a size of available sandcasting cope and drag pairs for the real part that is sandcast or to a platen size of one or more diecasting machines operational at the manufacturing facility, etc. to predict tooling and/or machine tools on which the real part may be produced.) Block S124 can then implement any of the foregoing techniques to suggest a reduction in a dimension of a virtual geometry in the virtual model to enable production of the part with a smaller mold and/or with a smaller injection molding machine, such as if the minimum rectilinear volume of the real part is on the cusp (e.g., with 0.025" in one or more dimensions) of enabling production of the real part with a smaller standard mold size and/or with a smaller injection molding machine, therefore reducing tooling costs and per-unit cost for the real part.

Block S120 can also prompt the user to select a material and/or a preferred manufacturing method for the part, filter available stock material types based on the selected material and/or manufacturing method, and select a nearest material stock cross section for production of the real part from the filtered set of available stock material types. Alternatively, Block 120 can predict a manufacturing process for the real part based on the geometry of the inserted stock geometry within the part file, such as by electing milling for a rectilinear extrusion with square faces, by electing turning for a revolved boss, by electing sheetmetal forming (e.g., bending) for sheetmetal features and/or weldments, by electing injection molding for stock geometries featuring draft angles and corresponding to a selection for a plastic material for the real part, by electing sand casting for large stock geometries featuring draft angles and correspond to selection of an aluminum-alloy or cooper-alloy material for the real part, by electing investment casting for small stock geometries featuring draft angles and corresponding to selection of an aluminum-alloy or cooper-alloy material for the real part, and/or by electing forging for stock geometries featuring draft angles and corresponding to selection of a steel-alloy material for the real part, etc. Block S122 can then filter materials and corresponding material stock sizes for the real part according to materials suitable for the manufacturing method, and Block S124 can implement methods or techniques described above to present a prompt—to the user—to adjust one or more dimensions or tolerances defined in the virtual model of the real part according to the determined manufacturing method to preemptively guide the user in reducing material costs, manufacturing time, production costs, lead time, etc. for the order of one or more units of the real part.

Similarly, Block S122 can predict a material for the real part, such as based on a stock geometry and/or a virtual feature inserted into the part file, and Block S124 can generate a prompt to adjust a dimension of a virtual feature within the virtual model according to the type of material predicted (or manually selected by the user) for the real part. For example, Block S122 can predict selection of and/or recommend a 304-series stainless steel (i.e., a weldable stainless steel) for the real part in response to insertion of a weldment feature within the part file, and Block S123 can predict selection of and/or recommend a 303-series stainless steel in response to insertion of a virtual feature—into the part file—suitable for turning or for milling. In this example, Block S122 can also access a customer file, determine that the customer (i.e., the user) has worked in medical devices based on data contained within the customer file, and thus predict selection of and/or recommend a 316L-series stainless steel for the real part based on the user's historic work with medical devices. Block S122 can then select a nearest material stock size from a set of stock sizes of the particular material predicted for the real part (or mold, fixture, etc.) and trigger Block S124 to generate a prompt for adjustment of a dimension of the real part accordingly, such as to reduce (or increase) a sheetmetal gauge selection for the real part if the material selected for the part is not available in a thickness substantially matching the thickness of a virtual sheetmetal feature inserted into the part file. Block S124 can further recommend an alternative material type and/or material grade based on availability and/or cost of stock materials in various stock geometries or cross-sections that better fit a minimum stock dimension of the real part represented in the virtual model. Blocks S120, S122, and S124 can also update the manufacturing method, material prediction, material recommendation, and/or dimension change prompt for the real part as additional geometry features are added to the part file. In particular, Blocks S120, S122, and S124 can repeat in response to insertion of each new feature into the virtual model to preemptively provide suggestions to the user to adjust dimensions, tolerances, and/or other geometries of each new feature, as applicable, to reduce manufacturing cost, to reduce materials cost, and/or to reduce manufacturing risk for the real part.

In one implementation, Block S124 prompts the user to modify a dimension of the modeled part by modifying a visual representation of the corresponding virtual feature, such as by highlighting a perimeter of a face in the virtual model or coloring (e.g., shading) a surface or volume in the virtual model (e.g., in red) to visually indicate the particular virtual feature under scrutiny. Block S124 can also display a textual notification, such as in the form of a bubble caption over the virtual feature in the CAD program, a textual note in a part feature tree in the part file, or a textual note and explanation within the DFM plug-in.

Block S124 can further present to the user—such as through the prompt, within the DFM plug-in, or otherwise within the CAD program—a cost related to manufacture of one or more units of the real part with the first material stock cross-section selected in Block S122 and the second material stock cross-section suggested for the real part in Block S124. For example, Block S122 can calculating a minimum stock length for the first material stock cross-section for a unit of the real part based on the minimum stock geometry for the real part, can calculate a first machining time for the real part with the first material stock cross-section, and can then estimate a first cost to manufacture the real part from the first material stock cross-section based on the first machining time and a cost of the first material stock cross-section of the minimum stock length. In this example, Block S122 can implement methods or techniques described in U.S. patent application Ser. No. 14/517,711 to transform the first machining time for the real part into a machining cost for producing the unit of the real part, such as based on machining center operating costs (including machining center setup and machining center operation), cutting tool costs, and a profit margin specified by the manufacturing facility. Furthermore, in this example, Block S122 can calculate a second machining time for the unit of the real part with the second material stock cross-section and can then estimate a second cost to manufacture the unit of the real part from the second material stock cross-section based on the second machining time and a cost of the second material stock cross-section of the minimum stock length. Block S124 can then display (e.g., render) the first cost and the second cost within the CAD program for review by the user. Generally, machining time can correlate proportionality to per-unit cost to produce the real part, machining time can correlate proportionally to a volume of material to be removed from material stock to produce a unit of the real part, and larger initial material stock for a unit of a real part requires removal of more material to complete the unit; therefore, by proposing an alternative (e.g., smaller) material stock for the real part, the method S100 may not only guide the user in designing a real part that can be manufactured with less expensive material stock but also guide the user in designing the real part that can be machined (or otherwise produced) in less time and therefore with lower manufacturing cost. Block S122 and S124 can cooperate to estimate and then present these cost data to the user, such as to provide qualitative support to the prompt and to provide incentive to the user in acting on the prompt. In this example, Block S122 can calculate the first cost and the second cost as per-unit costs, that is, as related costs for manufacturing one unit of the real part according to the virtual geometry with the respective material stock cross-sections. Alternatively, Blocks S122 and S124 can cooperate to project the first cost and the second cost across a quantity of units selected for submission with the order to the manufacturing facility; Block S124 can thus present to the user projected costs for the full order of units of the real part produced with material stock of the first material stock cross section and produced with material stock of the second material stock cross-section. In this implementation, Block S124 can further estimate costs to produce and install fixtures (e.g., fixture plates, custom soft jaws) for manufacturing the real part and sum these costs with the materials costs and machining costs for the first and second material stock cross-sections to generate the first cost and the second cost. Block S124 can additionally or alternatively display a difference between the first cost and the second cost or present cost-related data to the user in any other way through the part file, the DFM plug-in, and/or the CAD program.

As shown in FIGS. 1 and 4, one variation of the method S100 includes Block S126, which recites, at a third time succeeding the first time and preceding the second time, in response to an adjustment of the dimension of the virtual feature within the CAD program, recalculating the minimum stock geometry for the real part based on the adjustment and presenting, through the CAD program, confirmation of realization of the second material stock cross-section with the adjustment of the dimension. Generally, Block S126 functions to respond to adjustment of one or more virtual features following presenting of a prompt in Block S124, such as by confirming that the adjustment enables production of the real part with the second material stock cross-section or by informing the user that the adjustment was insufficient to enable production of the real part with the second material stock cross-section. For example, in response to receipt of a change to a dimension and/or to a dimensional tolerance associated with a virtual feature suggested for adjustment in Block S124, Block S126 can trigger Blocks S120, S122, and/or S124 to repeat to substantiate or refute the adjustment.

Furthermore, as shown in FIG. 4, one variation of the method S100 includes Block S128, which recites, in response to insertion of a second virtual feature into the virtual model, recalculating the minimum stock geometry for the real part based on the second virtual feature; selecting a third material stock cross-section from the set of available material stock cross-sections based on the minimum stock geometry; and at a third time succeeding the first time and preceding the second time, prompting the user, through the CAD program, to adjust a dimension of the second virtual feature to enable production of the real part with a fourth material stock cross-section, in the set of available material stock cross-sections of the material, less than the third material stock cross-section. Generally, Block S128 functions to trigger Blocks S120, S122, and S124, etc. to repeat in response to insertion of a subsequent virtual geometry into the virtual model to recheck the minimum stock geometry of the real part, identify a new material stock cross-section sufficient for the new minimum stock geometry of the real part, and to suggest to the user to adjust the second virtual feature (or any other virtual feature within the virtual model) if such minor adjustment in the virtual model enables faster and/or less expensive production of the real part with less material waste.

However, Blocks S120, S122, S124, S126, and/or S128, etc. can cooperate in any other way to detect a first material stock size for production of the real part and to prompt the user to modify one or more dimensions and/or tolerances defined in the virtual model to enable production with a smaller material stock cross-section size, a smaller mold, a smaller fixture, or a smaller machining center, to enable improved fixturing, to enable production in a better-suited machining center, or to enable more streamlined part production, thereby reducing materials cost, manufacturing time, manufacturing risk, and manufacturing cost for the order of one or more units of the real part.

6. Tooling

Block S130 of the method S100 recites, in response to insertion of a virtual feature into the virtual model, preemptively selecting a first cutting tool, from the set of cutting tools specified in the manufacturing file, of greatest dimension suitable for machining the real part according to the virtual feature, and Block S132 of the method S100 recites, at a first time, prompting a user, through the CAD program, to adjust a geometry of the virtual feature to enable machining of the real part with a second cutting tool, in the set of cutting tool, of dimension greater than a dimension of the first cutting tool. Generally, Blocks S130 and S132 function to prompt the user to modify a virtual feature within the virtual model to enable manufacture of the real part (represented by the vital model) with an alternative cutting tool, such as a larger endmill or a tool of a more stable geometry (e.g., a fillet-tip lathe tool rather than a hard-pointed lathe tool) than would be possible with a current virtual geometry of the virtual model.

In one implementation, in response to insertion of a bore geometry into the part file, Block S130 extracts a bore size from the bore geometry and compares the bore size to common twist drill sizes noted in the manufacturing file. For a bore size that does not match a common twist drill size (within a tolerance specified for the bore geometry and the common twist drill sizes), Block S132 can display a prompt suggesting an alternative bore size. For example, as shown in FIG. 1, for an entered bore size of 0.252", Block S132 can suggest modification of the bore geometry to a nearest smaller bore size of 0.250", which matches a #72 twist drill size, or to a nearest larger bore size of 0.260", which matches a #71 twist drill size.

In the foregoing example, Block S132 can also suggest modification of the bore geometry to a bore size of 0.251", which matches a common 0.001"-overbore reamer size for a 0.250" bore. In this example, Block S32 can further calculate a cost to machine a unit of the real part with each or a subset of the 0.252", 0.250", 0.260", and 0.251" bore sizes and present these feature manufacture-specific costs variants to the user, such as through the DFM plug-in or through the CAD program. For example, Block S132 can implement methods and techniques similar to those in Block S124 described above to calculate: a cost to drill the bore geometry with a #72 twist drill, move the real part to a wire EDM machine, and to remove the final 0.002" from the diameter of the bore geometry with the wire EDM machine; a cost to produce a custom twist drill of nominal 0.252" diameter, to load a machining center with the custom twist drill, and to machine the bore geometry with the custom twist drill; a cost to drill the bore geometry with a standard #72 twist drill; a cost to drill the bore geometry with a standard #71 twist drill (a less common size than the #71 twist drill); and a cost to drill the bore geometry with a standard #72 twist drill, to select a 0.251" oversized reamer at the machining center, and to ream the bore to 0.251" with the oversized reamer. In this example, Block S132 can implement methods and techniques described in U.S. patent application Ser. No. 14/517,711 to estimate a setup time for loading the foregoing tools into a machining center, a tool change time (e.g., for switching from a twist drill to a reamer), a setup time for loading the real part into one or various machining centers, and/or a time to perform the drilling and reaming operations with each of the cutting tools, such as based on operation models defined in the manufacturing file; Block S132 can then convert each of these times into corresponding costs based on cost data or cost model defined in the manufacturing file. Block S132 can sum each of these costs for a single unit of the real part or for the total quantity of units of the real part set in the order and then present these values to the user, such as through the DFM plug-in or through the CAD program, to enable the user to ascertain the cost effect of each drilling operation option.

In this implementation, Block S130 can also extract a bore termination form from the entered bore geometry and can then compare the bore termination form to common bore termination forms noted in the manufacturing file. For a square-shouldered blind bore, Block S132 can display a prompt to alter the blind bore to a through-hole or to alter termination of the bore to a conical section common to drilling with a twist drill, as shown in FIGS. 1 and 3. As described above, Block S132 can also estimate costs associated with producing the bore geometry with the various possible bore termination forms, such as including: a cost to drill with a twist drill and to then plunge an endmill into the bore to square the bottom of the bore; a cost to drill the bore through the real part; a cost to machine a plug and to then insert the plug at the bottom of the blind bore to form the square-shouldered bore termination form; and a cost to drill the bore with a twist drill and to leave the conical bore termination form intact. Block S132 can then present these cost data to the user, such as described above.

Block S132 can further calculate the aspect ratio (i.e., a ratio of length to diameter) of the bore geometry and prompt the user to reduce a length of the bore geometry and/or increase a diameter of the bore geometry if the aspect ratio of the bore geometry exceeds the maximum recommended bore aspect ratio specified in the manufacturing file. In this implementation, Block S132 can implement methods and techniques described in U.S. patent application Ser. No. 14/517,711 to estimate a first failure risk for manufacturing a unit of the real part according to the current bore geometry defined in the virtual model, such as based on a material selected for the real part, the maximum recommended bore aspect ratio (e.g., for the selected material), and/or a manufacturing history of the manufacturing facility specified in the manufacturing file. Block S132 can also implement a risk model to predict a risk of failure in creating the bore geometry in other preferred bore aspect ratios, transform the estimated failure risks for the various bore aspect ratios into manufacturing costs, and present these costs to the user in conjunction with corresponding recommended changes to the bore geometry, as described above.

In another implementation, Block S130 and S132 cooperate to prompt the user to adjust the geometry of a virtual feature in the virtual model to enable machining of the real part—according to the virtual model—with the second cutting tool of radius greater than a radius first cutting tool. In one example, in response to insertion of a virtual pocket into the virtual model, Block S130 determines a maximum endmill size suitable for machining the pocket into the real part. Block S132 can then prompt the user to modify the geometry of the pocket, such as if the geometry of pocket necessitates machining with a cutting tool of relatively high aspect ratio (e.g., an aspect ratio greater than a threshold aspect ratio) or if a ratio of volume of material to be removed from the pocket to a diameter of the cutting tool exceeds a threshold volume to tool diameter ratio. For example, Block S130 can: predict a suitable or preferred orientation of the real part within a machining center to machine the pocket into the real part; extract a maximum depth, a minimum width, and a minimum internal fillet radius of a vertical corner of the pocket; set a maximum diameter of a cutting tool to produce the pocket based on the lesser of the minimum width of the pocket and the minimum internal fillet radius of the pocket; and set a minimum cutting length of the cutting tool based on the maximum depth of the pocket. In this example, Block S130 can then cross reference the maximum diameter and the minimum cutting length of the cutting tool against dimensions of cutting tools available at the manufacturing facility, as specific in the manufacturing file, to filter a list of cutting tools down those suitable for producing the pocket in the real part. In this example, Block S130 can also apply further filters to the list of cutting tools suitable for producing the pocket based on a material selected for the real part, such as high-speed steel cutting tools for plastic, solid tungsten carbide cutting tools for aluminum, titanium carbonitride cutting tools for stainless steel, diamond-coated tungsten carbide cutting tools for ceramics (e.g., alumina), and cobalt cutting tools for exotic materials (e.g., titanium). Block S130 can apply filters to the list of cutting tools suitable for producing the pocket based on a dimensional tolerance defined in the virtual model for the pocket and/or based on a volume of material to be removed from the real part to create the pocket, such as by selecting a single three-flute endmill for roughing and finishing passes for producing a relatively small pocket and/or a pocket with relatively loose tolerances (e.g., ±0.005") and selecting a first roughing endmill and a second five-flute finishing endmill for producing a relatively large pocket and/or a pocket with relatively tight tolerances (e.g., ±0.002"). Block S130 can thus identify a particular cutting tool—from the set of cutting tools available for machining at the manufacturing facility—suitable for machining the pocket in the real part, such as a particular cutting tool of largest diameter and smaller cutting length that meets the material, geometry, cutting type (e.g., finishing, roughing), and other requirements thus identified for producing the pocket in the real part according to the dimensions and tolerances specified by the user.

In this implementation, Block S132 can then retrieve a risk assessment for the selected cutting tool(s)—such as from the manufacturing file or directly from a supplier or manufacturer of the cutting tool—indicating a risk of breaking or damaging the cutting tool while machining the pocket in the selected material for the real part. (Alternatively, Block S132 can calculate the risk of machining the pocket with the selected cutting tool, such as based on a tooling risk model contained within the manufacturing file.) In particular, the risk of machining with a cutting tool can be inversely proportional to a diameter of the cutting tool, proportional to the length of the cutting tool, and related to a flute profile, a flute number, a flute rake, and a material to be machined, and Block S132 can manipulate this risk assessment for the cutting—in the context of the pocket in question—to selectively deliver a prompt to the user to modify a virtual feature within the virtual model to enable production of the pocket in the real part with a larger (e.g., more stable) cutting tool yielding less manufacturability risk. For example, the manufacturing file can specify a maximum recommended aspect ratio (i.e., ratio of length to diameter) for a cutting tool for a particular material (e.g., 8:1 for plastic, 6:1 for aluminum, and 4:1 for steel) (such as based on an assessed risk of breaking or damaging the tool during the machining operation), and Block S132 can deliver a prompt to the user to increase a minimum internal corner fillet radius of the pocket and/or to decrease a depth of the pocket to enable machining of the pocket in the real part with a cutting tool of a smaller aspect ratio (e.g., closer to or less than the maximum recommended aspect ratio). Similarly, Block S132 can deliver a prompt to the user to insert an inward step at some depth within the pocket and/or to loosen a tolerance on the width dimension or a flatness of a wall of the pocket to enable manufacture of the pocket with a tool of a shorter cutting length. If and once a modification to the pocket is made within the virtual model, Blocks S130 and S132 can repeat to reassess the geometry of the pocket to confirm that a lower-risk cutting tool can be used to create the pocket according to the amended pocket geometry and/or to confirm that the maximum recommended aspect ratio is met for a cutting tool selected for the pocket.

However, in the foregoing implementation, if no suitable cutting tool for producing the pocket via conventional machining techniques is identified from the list of available cutting tools, Block S130 can flag the virtual pocket feature in the virtual model and trigger Block S132 to prompt the user to modify the virtual pocket feature. For example, if the virtual pocket feature defines square internal corners, Block S130 can flag the pocket as unsuitable for conventional machining, and Block S132 can prompt the user to insert a fillet at each vertical internal corner of the virtual pocket feature. Block S132 can also estimate a preferred minimum internal fillet radius based on a depth of the pocket and a minimum recommended aspect ratio of a cutting tool and present this minimum internal fillet radius to the user within the prompt. In this example, Block S132 can also identify an alternative manufacturing method for producing the pocket with square internal corners, such as via a second wire EDM machining operation or by brazing or welding distinct structures together to form the pocket; Block S132 can then implement methods or techniques as described above and in U.S. patent application Ser. No. 14/517,711 to estimate per-unit and/or a per-order costs for manufacturing the real part with a cutting tool of the recommended size via conventional machining and/or for manufacturing the real part via the alternative manufacturing method(s). Block S132 can present these costs to the user in the prompt—such as with options to select one or more alternative manufacturing methods for producing the real part—enable the user to ascertain the costs of producing the real part with the pocket as current specified in the virtual model and to weigh such costs against a perceived value of the current geometry.

In another implementation, Block S132 estimates a volume of material to be removed from the real part to machine the real part according to the virtual feature (e.g., the pocket) with the cutting tool and prompts the user to adjust the geometry of the virtual feature to enable machining of the real part according to the virtual feature with a second (e.g., larger) cutting tool in response to a ratio of the volume of material to be removed to a radius of the first cutting tool that exceeds a threshold ratio. As in the foregoing example, for a first cutting tool selected in Block S130, Block S132 can calculate a volume of the pocket, calculate a cutting volume of the cutting tool (e.g., based on the diameter of the cutting flutes along the lesser of the depth of the pocket and the length of the flutes of the cutting tool), and deliver a prompt to the user to modify the pocket if the ratio of the volume of the pocket to the cutting volume of the cutting tool exceeds a threshold ratio value (e.g., 80:1) in order to enable a larger cutting to be used to produce the pocket, thereby reducing machining time and per-unit cost of the real part. Block S132 can additionally or alternatively trigger Block S130 to preemptively select a second cutting tool for a roughing pass through the pocket, followed by a finishing pass with a (smaller) finishing cutting tool.

In yet another implementation, Block S132 delivers a prompt to the user to smooth a compound surface defined in a virtual feature in the virtual model to enable surfacing of the real part with the second cutting tool (e.g., a ball endmill) of size (e.g., a second spherical radius greater) than the size of the first cutting tool (e.g., a first spherical radius). In this implementation, in response to insertion of a virtual compound surface into the part file, Block S130 calculates a derivative of the virtual compound surface to determine a maximum radius of a cutting tool (e.g., a ball endmill) with which the real part can be machined according to the virtual compound surface, such as within a default or user-entered tolerance (e.g., ±0.005"), and selects a cutting tool of dimension (e.g., spherical radius) less than or equal to the maximum determined cutting tool radius, as shown in FIG. 5. In this implementation, Block S132 can calculate a frequency of maximum cutting tool radii across the compound surface, identify an outlier of substantially small maximum cutting radius based on the frequencies of maximum cutting tool radii across the compound surface, and prompt the user to soften the corresponding region of the virtual compound surface in the virtual model to enable surfacing with a larger cutting tool (e.g., ball endmill) and/or with a larger step-over to create the compound surface in the tangible workpiece. For example, Block S132 can highlight the corresponding region of the virtual compound surface in the virtual model displayed (e.g., rendered) within the CAD program to guide the user identifying the portion of the virtual model to be modified, as shown in FIG. 5. Block S132 can similarly display, within the CAD program or within the DFM plug-in, a prompt to loosen a tolerance on a dimension of the virtual compound surface feature to enable the dimensional requirements of the real part—as specified in the virtual model—to be met with a large cutting tool.

Block S132 can implement any suitable technique or method to present the notification to the user through the CAD program or the DFM plug-in, such as by highlighting or shading a corresponding virtual feature in a 3D rendering of the virtual model of the real part, such as described above. However, Block S132 can function in any other way to generate and display a suggestion for an alternative dimension of a virtual feature within the part file.

As in the foregoing implementations and as in Block S124, Block S130 and S132 can further cooperate to: calculate a first machining time for machining the real part according to the virtual feature with the first cutting tool; estimate first cost to machine the real part with the first cutting tool based on the first machining time and a cost of the first cutting tool; calculate a second machining time for machining the real part according to the virtual feature with the second cutting tool; estimate a second cost to machine the real part with the second cutting tool based on the second machining time and a cost of the second cutting tool; and display, within the CAD program, the first cost and the second cost.

As shown in FIGS. 4 and 5, one variation of the method S100 include Block 136, which recites, at a third time succeeding the first time and preceding the second time, in response to an adjustment of the geometry of the virtual feature within the CAD program, recalculating the maximum tool radius for machining the real part according to the virtual geometry and presenting, through the CAD program, confirmation of realization of the second cutting tool for machining the real part according to the virtual feature in response to the maximum tool radius exceeding a radius of the second cutting tool. Generally, Block S136 can implement methods and techniques similar to those of Block S126 described above to reassess cutting tool options for the real part based on a modification made to one or more virtual features in the virtual model, such as following a prompt delivered to the user in Block S132. For example, Block S136 can trigger Blocks S130 and S132 to repeat in response to a change to a dimension and/or to a tolerance of a virtual feature of the virtual model.

However, Blocks S130, S132, and/or S126, etc. can cooperate in any other way to detect a first cutting tool for producing a portion of the real part and to prompt the user to modify one or more dimensions and/or tolerances defined in the virtual model to enable production of the real part with a larger, more stable, or less risky cutting tool, thereby reducing machining time, tooling cost, manufacturing risk, and manufacturing cost for the order of one or more units of the real part.

7. Manufacturability

As shown in FIG. 1, one variation of the method S100 includes Block S140, which recites generating a manufacturability score for a dimensioned virtual feature within the virtual model based on the availability of a machining center initially selected for producing the real part. In this variation, the method S100 can further include Block S142, which recites displaying a notification within the CAD program in response to the manufacturability score for that falls below a threshold manufacturability score, the notification including a suggestion for a modification to the virtual feature. Generally, Blocks S140 and S142 function to estimate a manufacturability of the real part and to prompt the user to modify a virtual feature in the virtual model to enable and/or improve manufacturability of the corresponding real part.

In one implementation, the method S100 records an aluminum sandcast part callout for the part file. In this implementation, in response to insertion of a virtual feature defining a square surface bisecting a predicted or selected parting line of the real part and parallel to a predicted or selected parting direction, Block S140 assigns a low manufacturability score to the real part with the new virtual feature due to lack of draft in the virtual feature, and Block S142 can prompt the user to modify the square surface of the new virtual feature accordingly. For example, Block S142 can prompt the user to create a draft angle on the square surface on each side of the real parting line. In this example, Block S140 can assign a manufacturability score proportional to the draft angle across the virtual feature, such as a manufacturability score of 10/100 for the virtual feature with a draft angle of 0°, a manufacturability score of 75/100 for the virtual feature with 2° of draft, and a manufacturability score of 100/100 for the virtual feature with 5° of draft, and Block S142 can prompt the user to modify the virtual feature if a corresponding manufacturability score falls below a threshold manufacturability score, such as a threshold manufacturability score of 20/100.

In another implementation, the method S100 records a plastic injection molded part callout for the part file. In this implementation, in response to insertion of a virtual feature defining an undercut, Block S140 assigns a low manufacturability score to the new virtual feature, and Block S142 prompts the user to replace the undercut with a properly-drafted surface within the virtual feature. In this implementation, if the user hides or ignores the notification, the method S100 can determine that the undercut is not an error or mistake in the part file, and Block S140 can generate a new manufacturability score corresponding to feasibility of a cam-actuated mold component to create the undercut. For a low manufacturability score for such a multi-part actuated injection mold, Block S142 can prompt the user to modify the position and/or geometry of the undercut to achieve a suitable manufacturability score for a multi-part actuated injection mold. Alternatively, Block S140 can generate a new manufacturability score corresponding to feasibility of a post-machining operation to create the undercut in the real part. For a low manufacturability score for a post-machining operation, Block S142 can similarly prompt the user to modify the position and/or geometry of the undercut to achieve a suitable manufacturability score for the post-machining operation.

In another implementation, in response to insertion of a virtual feature defining a square-cornered pocket into the part file, Block S140 can estimate a low manufacturability score for the square-cornered pocket based on a minimum pocket corner radius for milling, as defined in the manufacturing file, and Block S142 can suggest a corner fillet of a size suitable to efficiently create the pocket of the defined depth and cross-section, such as described above.

Block S142 can also implement any suitable technique or method to present the notification to the user through the CAD program or through the DFM plug-in, such as by highlighting or shading a corresponding virtual feature in a 3D rendering of the virtual model of the real part, such as described above. However, Block S140 can identify manufacturability errors within the part file in any other way or according to any other manufacturability scoring system, and Block S142 can function in any other way to generate and display a suggestion for an alternative dimension or form of a virtual feature within the part file.

The method S100 can also repeat any of the foregoing Blocks as additional virtual features are added to the part file and to generate prompts to alter a current and/or previously-entered virtual feature(s) to enable and/or improve manufacturability of the real part as a whole.

8. Order Submission

Block S150 of the method S100 recites, at a second time succeeding the first time, submitting, to a manufacturing facility and over a computer network, an order for production of a unit of the real part according to the virtual model. Generally, Block S150. Generally, Block S150 functions to receive confirmation for submission of an order for one or more units of the real part from the user through the CAD program and/or quoting plug-in and to transmit relevant part data and order details to the manufacturing facility—such as over a computer network (e.g., the Internet)—for queuing (i.e., scheduling) fulfillment of the order by the manufacturing facility, as shown in FIGS. 4 and 5.

In one implementation, Block S150 transmits the completed virtual model of the real part in the form of a digital file to the manufacturing facility, such as by uploading the part file in whole to a server affiliated with the manufacturing facility. Similarly, Block S150 can convert the part file containing the virtual model into an alternative file type readable by manufacturing facility and/or can encrypt the part file before transmission to the manufacturing facility, such as according to Data Encryption Standard (DES), Triple Data Encryption Standard (3-DES), or Advanced Encryption Standard (AES) or according to Diffie-Hellman key exchange, Wireless Transport Layer Security (WTLS), or other suitable cryptographic protocol(s). Alternatively, Block S150 can generate an engineering drawing with plan, elevation, and/or breakout sections for the real part based on the virtual model and then transmit these engineering drawing to the manufacturing facility.

Block S150 can also transmit an order form for the real part—directly or indirectly (e.g., through a remote server) to the manufacturing facility over the computer network. For example, the order form can specify: a quantity of units of the real part; a projected delivery date or delivery window; a projected cost of the order; specifications for the material, the minimum stock length, and the second material stock cross-section, as calculated in Blocks S120, S122, and S124; and/or a specification for machining the real part according to the virtual feature with a particular cutting tool or a particular set of cutting tools, as selected in Blocks S130 and S132. The manufacturing facility can also transmit manufacturing notes, such as specific machining centers and tooling to complete a manufacturing operation for the part, manufacturing operation order and part flips, auto-generated tool paths for various manufacturing operations including callouts for a particular machining center or machining center type and standard or custom tooling, etc.

Block S150 can also handle payment from the user to the manufacturing facility, such as for a portion of the manufacturing quote, such as for 20% of the total of manufacturing quote or upfront payment for all tooling and stock material cost. Once the order is fulfilled, Block S150 can also handle payment of the remainder of the balance from the user to the manufacturing facility. However, Block S150 can function in any other way to communicate (e.g., transmit) a form of the part file and the manufacturing quote to the manufacturing facility once the part order is confirmed locally by the user through the CAD program or through quoting plug-in, etc.

9. Human Interface

The method S100 can further support part file review by a human representative (e.g., manufacturing engineer) of the manufacturing facility, such as in real-time with the user through a chat window within the CAD program or DFM plug-in or asynchronously after submission of the part file to the manufacturing facility for production. In one example, the method S100 enables the representative to override a DFM prompt (e.g., to modify a virtual feature) generated in a Block of the method S100, such as by entering an alternative DFM prompt specifying a different type or degree of virtual feature adjustment or by deleting the DFM prompt altogether. In this example, the method S100 can then insert details of the manual DFM prompt override into a manufacturing model in the form of supervised or semi-supervised machine learning to teach a DFM model over time as additional manufacturability changes are submitted by one or more representatives for various part orders. The DFM model can then be uploaded to the CAD program or DFM plug-in at the user's computing device or inserted into the manufacturability file to improve DFM error detection and correction over time The method S100 can also implement a communication (e.g., chat) window within the CAD program or the DFM plug-in to enable textual, audio, and/or visual communication between the user and the representative. The method S100 can thus enable the user to provoke the representative to justify or alter a (questionable) DFM prompt or manufacturing suggestion output in one or more Blocks of the method S100, and the method S100 can insert the representative's response into the DFM model as described above. However, the method S100 can function in any other way to implement DFM checks as a part is virtually created within a CAD program.

The systems and methods of the invention can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A method for implementing design-for-manufacturing checks during construction of a virtual model of a real part, the method comprising, at a computer-aided drafting engine executing on a computing device:
   receiving, at the computer-aided drafting engine, a manufacturing file specifying a set of available material stock-cross sections for a manufacturing facility;
   in response to receipt of a first virtual feature for the virtual model at the computer-aided drafting engine, determining a first set of manufacturability scores for each of a plurality of stock orientations, comprising, for each stock orientation of the plurality:
      identifying a first set of manufacturability errors associated with the stock orientation based on the first virtual feature, a corresponding material stock cross-section from the set of available material stock cross-sections, and the stock orientation, and
      determining a first manufacturability score for the stock orientation based on the first set of manufacturability errors, wherein the first set of manufacturability scores comprises the first manufacturability score for the stock orientation;
   generating a first ranking for the plurality of stock orientations based on the first set of manufacturability scores;
   selecting a first stock orientation from the plurality of stock orientations, based on the first ranking; and
   presenting, at the computer-aided drafting engine, a first manufacturability error of the first set of manufacturability errors associated with the selected first stock orientation.

2. The method of claim 1, further comprising:
   in response to receipt of a second virtual feature for the virtual model at the computer-aided drafting engine, determining a second set of manufacturability scores for each of the plurality of stock orientations, comprising, for each stock orientation of the plurality:
      identifying a second set of manufacturability errors associated with the stock orientation based on the first and the second virtual features, the stock orientation, and the corresponding material stock cross-section, and
      determining a second manufacturability score for the stock orientation based on the second set of manufacturability errors, wherein the second set of manufacturability scores comprises the second manufacturability score for the stock orientation;
   generating a second ranking for the plurality of stock orientations based on the second set of manufacturability scores;
   selecting a second stock orientation from the plurality of stock orientations, based on the second ranking; and
   presenting, at the computer-aided drafting engine, a second manufacturability error of the second set of manufacturability errors associated with the selected second stock orientation.

3. The method of claim 2, wherein the first stock orientation is distinct from the second stock orientation.

4. The method of claim 2, further comprising prompting the user to perform an adjustment to the first virtual feature to correct the second manufacturability error, concurrently with presenting the second manufacturability error.

5. The method of claim 4, wherein prompting the user to perform the adjustment to the first virtual feature comprises prompting the user to adjust the tolerance of a dimension of the first virtual feature based on a standard dimensional tolerance of the material stock cross-section corresponding to the selected second stock orientation.

6. The method of claim 1, further comprising:
   prompting a user to perform a preferred adjustment of the first virtual feature to correct the first manufacturability error at the computer-aided drafting engine, wherein the preferred adjustment of the first virtual feature increases the manufacturability score associated with the selected first stock orientation;
   in response to the user performing the preferred adjustment of the first virtual feature, comparing the increased manufacturability score with a threshold manufacturability score; and
   in response to the increased manufacturability score exceeding the threshold manufacturability score, estimating a cost to manufacture the real part, based on the selected first stock orientation and the adjusted first virtual feature.

7. The method of claim 6, wherein prompting the user to perform the preferred adjustment of the first virtual feature comprises:
identifying a set of adjustments to the first virtual feature, each adjustment of the set of adjustments capable of correcting the first manufacturability error;
determining a set of machining times comprising machining times for each of the set of adjustments, wherein determining a machining time for each of the set of adjustments comprises: calculating a machining time for the real part based on the adjustment of the first virtual feature, the first selected stock orientation, and the corresponding material stock cross-section; and
selecting an adjustment from the set of adjustments, wherein the adjustment is associated with a shortest machining time of the set of machining times, and wherein the adjustment is the preferred adjustment of the first virtual feature.

8. The method of claim 1, wherein the manufacturing file further specifies a set of available cutting tools for a manufacturing facility, each cutting tool associated with a geometry, wherein identifying the first set of manufacturability errors is further based on the respective geometries of the set of available cutting tools.

9. The method of claim 8:
wherein identifying the first set of manufacturability errors comprises, for each of the geometries of the set of available cutting tools: analyzing a feasibility of machining the real part using the geometry of the set of available cutting tools according to the first virtual feature, the stock orientation, and the corresponding material stock cross-section; and
wherein determining the first manufacturability score for the stock orientation comprises determining the manufacturability score based on the feasibility.

10. The method of claim 8 wherein the selected first stock orientation ranks highest in the first ranking for the plurality of stock orientations.

11. A method for implementing design-for-manufacturing checks during construction of a virtual model of a real part, the method comprising, at a computer-aided drafting engine executing on a computing device:
in response to receiving a virtual feature for the virtual model, determining a first set of manufacturability scores for a plurality of stock orientations, comprising, for each of the plurality:
analyzing a machining feasibility of machining the real part based on the stock orientation and the virtual feature, comprising estimating a first cost of machining the real part according to the stock orientation and the virtual feature, and
determining a manufacturability score for the stock orientation based on the machining feasibility, comprising determining the manufacturability score based on the estimated first cost, wherein the first set of manufacturability scores comprises the manufacturability score for the stock orientation;
generating a ranking for the plurality of stock orientations based on the first set of manufacturability scores;
selecting a first stock orientation from the plurality of stock orientations, based on the ranking; and
presenting, at the computer-aided drafting engine, a first feasibility notification related to the machining feasibility associated with the selected first stock orientation, comprising presenting the estimated first cost to the user.

12. The method of claim 11, wherein presenting the first feasibility notification further comprises presenting a user prompt to perform an adjustment of the virtual feature, wherein the adjustment of the virtual feature increases the manufacturability score associated with the selected first stock orientation, the method further comprising: in response to the user performing the adjustment of the virtual feature, estimating a second cost to manufacture the real part, based on the selected first stock orientation and the adjusted virtual feature, wherein the estimated second cost is less than the estimated first cost.

13. The method of claim 11, further comprising:
receiving a manufacturing file specifying a set of materials available for machining at a manufacturing facility;
prompting the user to select from the set of materials; and
receiving a user selection of a material from the set of materials, wherein analyzing machining feasibility is further based on the user-selected material.

14. The method of claim 13, further comprising:
in response to each manufacturability score of the first set of manufacturability scores falling below a threshold manufacturability score, determining a second set of manufacturability scores, comprising for each of the set of materials:
determining a manufacturability score based on the machining feasibility of machining the real part according to the material, the selected first stock orientation, and the virtual feature, wherein the second set of manufacturability scores comprises the manufacturability score;
generating a ranking for the set of materials based on the second set of manufacturability scores; and
identifying a suitable material from the set of materials, based on the ranking for the set of materials, wherein the first feasibility notification further comprises a suggestion to the user to select the suitable material.

15. The method of claim 11, further comprising selecting a second stock orientation from the plurality of stock orientations based on the ranking, wherein the first feasibility notification is further related to the machining feasibility associated with the second stock orientation.

16. A method for implementing design-for-manufacturing checks during construction of a virtual model of a real part, the method comprising, at a computer-aided drafting engine executing on a computing device:
in response to receiving a virtual feature for the virtual model, determining a first set of manufacturability scores for a plurality of stock orientations, comprising, for each of the plurality:
analyzing a machining feasibility of machining the real part based on the stock orientation and the virtual feature, comprising identifying a set of manufacturability errors associated with the stock orientation, and
determining a manufacturability score for the stock orientation based on the machining feasibility, wherein the first set of manufacturability scores comprises the manufacturability score for the stock orientation;
generating a ranking for the plurality of stock orientations based on the first set of manufacturability scores;
selecting a first stock orientation from the plurality of stock orientations, based on the ranking; and presenting, at the computer-aided drafting engine, a first feasibility notification comprising a user prompt to perform an adjustment of the virtual feature to correct a first manufacturability error of the set of manufacturability errors associated with the selected first stock orientation, wherein the adjustment of the virtual feature increases the manufacturability score associated with the selected first stock orientation.

17. The method of claim 16, further comprising:
in response to the user performing the adjustment of the virtual feature, recalculating the manufacturability score;
generating an updated ranking for the plurality of stock orientations based on the recalculated manufacturability score;
selecting a second stock orientation from the plurality of stock orientations, based on the updated ranking, wherein the selected second stock orientation is distinct from the selected first stock orientation; and
presenting, at the computer-aided drafting engine, a second feasibility notification related to the selected second stock orientation and the adjusted virtual feature.

18. The method of claim 16, further comprising:
in response to the user performing the adjustment of the virtual feature, calculating a machining time for the real part based on the adjusted virtual feature and the first selected stock orientation;
estimating a cost to manufacture the real part based on the machining time; and
displaying the cost within the computer-aided drafting engine.

19. The method of 18, further comprising submitting, to a database associated with the manufacturing facility, an order for production of a unit of the real part, the order comprising the first selected stock orientation and the virtual model with the virtual feature.

20. The method of claim 16, further comprising:
receiving a manufacturing file specifying a set of materials available for machining at a manufacturing facility;
prompting the user to select from the set of materials; and
receiving a user selection of a material from the set of materials, wherein analyzing the machining feasibility is further based on the on the user-selected material.

* * * * *